United States Patent [19]
Foltz et al.

[11] Patent Number: 5,740,422
[45] Date of Patent: Apr. 14, 1998

[54] METHOD AND APPARATUS FOR RESOURCE MANAGEMENT FOR A LAN SERVER ENTERPRISE

[75] Inventors: Richard Campbell Foltz, Round Rock; William Harold Gengler, Austin; Joseph Christopher Lucas, Jr., Round Rock; John Vincent Meegan, Austin; Troy Gary Reish, Austin; James Michael Rolette, Jr., Austin, all of Tex.

[73] Assignee: International Business Machine Corporation, Armonk, N.Y.

[21] Appl. No.: 534,762

[22] Filed: Sep. 27, 1995

[51] Int. Cl.$^6$ .................................................. G06F 12/00
[52] U.S. Cl. ................................... 395/609; 395/200.59
[58] Field of Search ......................... 395/200.1, 601, 395/609, 610, 200.31, 200.59

[56] References Cited

U.S. PATENT DOCUMENTS

| | | | |
|---|---|---|---|
| 5,432,934 | 7/1995 | Levin | 395/650 |
| 5,534,855 | 7/1996 | Shockley | 340/825.3 |
| 5,572,673 | 11/1996 | Shurts | 395/186 |
| 5,579,478 | 11/1996 | Heiserman | 395/186 |

*Primary Examiner*—Eric Coleman
*Attorney, Agent, or Firm*—David A. Mims, Jr.

[57] ABSTRACT

A method and architecture for the administration of large cells in an Open System Foundation/Distributed Computing Environment (OSF/DCE). The architecture organizes the Cell Directory Service (CDS) name space of the OSF/DCE to allow a network administrator to easily determine network resources under their control, and work with a subset of the network resources. The OSF/DCE name space is organized as resource realms having a CDS component and a registry component. The CDS component of the resource realms has a fixed portion containing at least two roots describing sub-systems and realm resources (e.g., printer, serial devices, etc.). The CDS component also contains individual realms defined directly below the fixed portions. The registry component has a root consisting of the security, group and realm portions. Individual realms are defined as directories below the root. The resulting resource manager which allows the OSF/DCE name space to be organized/partitioned into separate, administrable name spaces which allows easy determination as to what resources are controlled by the administrator, and easily administrable subsets of network resources.

15 Claims, 3 Drawing Sheets

METHOD AND APPARATUS FOR RESOURCE MANAGEMENT FOR A LAN SERVER ENTERPRISE

FIELD OF THE INVENTION

The present invention relates to data processing systems, and more particularly to the management of resources in a distributed computing environment.

BACKGROUND OF THE INVENTION

The increased use of computers in business and at home, due to reduced costs and increased computer literacy, has led to an increased demand for access between computer systems. Portable computers allow users to move them freely about the world but these users continue to require constant access to their host applications, files, databases and electronic mail via connections to other computer systems. New networks of computers require more access to more and more disparate networks and related systems. These increasing demands have produced the present focus on Distributed Computer Systems and methods to interoperate these systems. This focus on interoperability is on developing means for easy access from one computing system to another, regardless of whether the two systems have different naming systems, different operating systems, different file systems, different databases, etc, with minimal cost of modifying any system to interoperate with another.

Major strides in system interoperability has been achieved using standards promulgated by the Open Software Foundation/Distributed Computing Environment ("OSF" is a trademark of Open Software Foundation, Inc.). In the Distributed Computing Environment (DCE), various software components my be located on more than one physical system, such as a number of computers in a distributed data processing system. Examples of such services include security, directory, and time services. These various components use each other's services by making internal calls to one another (in the form of messages sent from one object to another object) as a way of satisfying a request for a particular service. For example, when an application invokes a security component requesting the addition of a new user to the security registry database, the message requesting an addition of a new user results in other messages being made to other parts of the security component to check that the component making this request is authorized to add users to the database, which in turn uses a remote procedure call (RPC) component to transmit these requests to the appropriate service.

While the current Open Software Foundation (OSF)/DCE implementation allows the connection of disparate data computing systems, a problem exists in the administration of large cells with potentially thousands of resources. As currently implemented, any DCE based distributed application requires the presence of all DCE services in order to operate (e.g., all or nothing). This includes the Cell Directory Server, Security Server and Distributed Time Servers. Also required are all the DCE runtime support (Threads, Remote Procedure Call (RPC), Cell Directory Services (CDS) and Distributed Time Services (DTS) and Security. This requirement causes installation, configuration and administrative problems. In addition, the product size is increased in terms of DASD and memory usage. One particular problem with the current, all or nothing implementation, is the inability of a network administrator to determine what resources are under their control. This is due in part to the lack of a hierarchical administration method. Network administrators, under the current implementation, are unable to work with a subset of resources (e.g., printers, servers, serial devices, etc.).

It is desirable to have a DCE resource administration method and architecture which allows the network administrators to easily determine what network resources are under their control, and to work with a subset of network resources.

SUMMARY OF THE INVENTION

This invention relates to a method and architecture for the administration of large cells in an Open System Foundation/Distributed Computing Environment (OSF/DCE). The OSF/DCE Cell Directory Services (CDS) is the location-independent lookup facility that enables the sharing of network resources. This invention provides a data structure/architecture for organizing the Cell Directory Service name space to allow a network administrator to easily determine network resources under their control, and to work with a subset of the network resources. The OSF/DCE name space is organized as resource realms having a CDS component and a registry component. Resource realms as used in this invention, is an architecture for organizing the CDS name space for LAN Server resources (e.g., aliases, public applications, servers) and for controlling access to these resources. The CDS component of the resource realm has a fixed portion containing at least two roots describing subsystems and realm resources (e.g., printer, serial devices, etc.). The CDS component also contains individual realms defined directly below the fixed portion. The resource realms provide a hierarchical model of administration in which administrators of a realm can administer resources in any sub-realm. The registry component has a root consisting of the security, group and realm portions. Individual realms are defined as directories below the root. The invention provides a resource manager which allows the OSF/DCE name space to be organized/partitioned into separate administrable name spaces, which allows easy determination as to what resources are controlled by the administrators.

DETAILED DESCRIPTION OF THE EMBODIMENTS

This invention provides a method and architecture for the administration of large cells in a distributed computing environment (DCE), which allow the efficient sharing of various resources among different machines configured in a networking environment (e.g., a cell in the OSF/DCE lexicon). The invention provides for the administration of a subset of resources by providing a hierarchical administration method. The invention allows network administrators to determine what resources they control by the use of the novel architecture and methods of this invention. The invention will be described more completely in reference to the following drawings.

Figure 1:
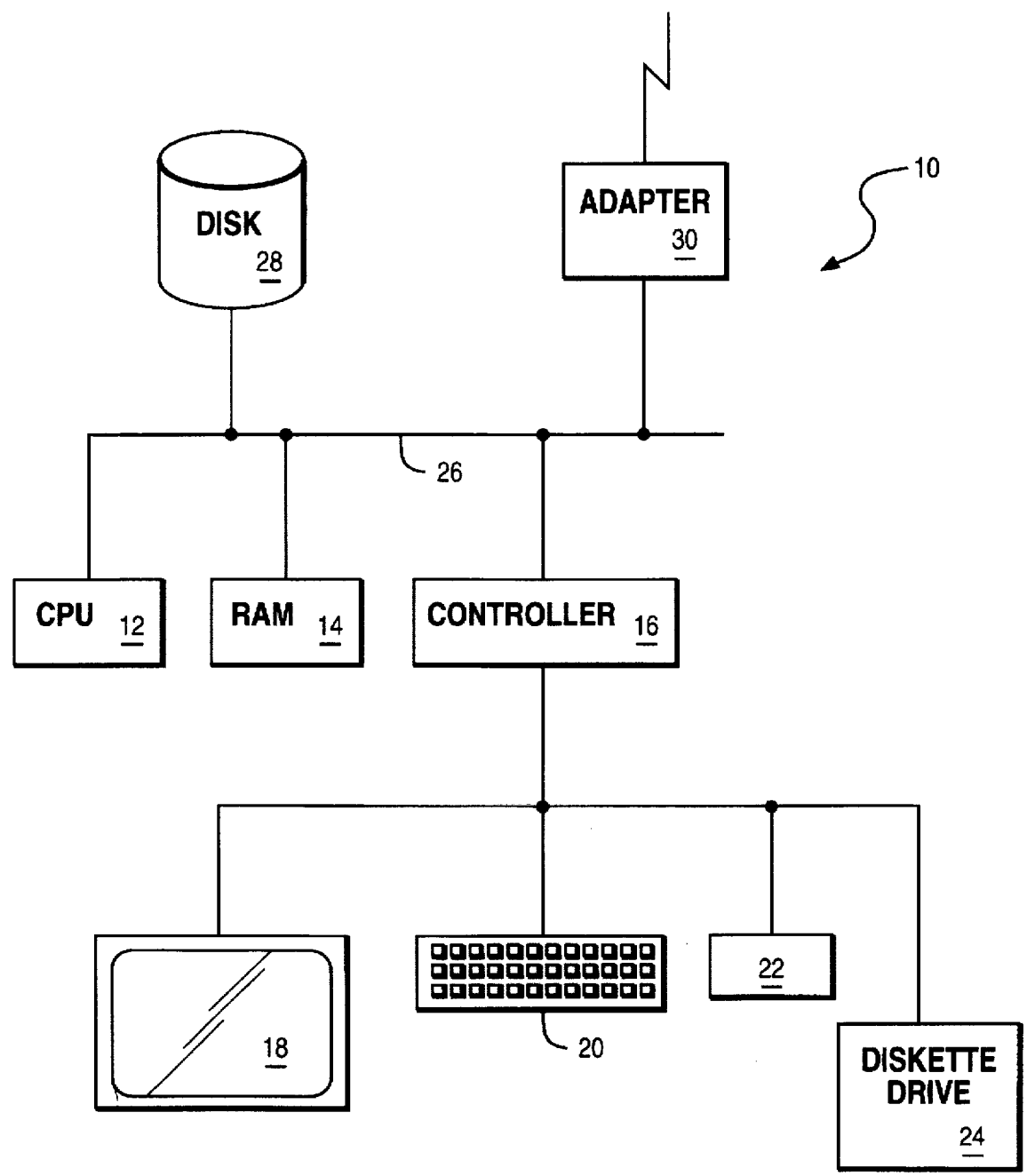
FIG. 1 is a block diagram of a workstation operable in a distributed computing environment where the invention may be practiced.

With reference to FIG. 1, there is shown a workstation 10 in a distributed computing environment where this invention may be practiced. The workstation 10, contains a central processing unit 12, and random access memory (RAM) 14, connected to a system bus 26. The workstation 10, has a device controller 16, attached to display device 18, and system bus 26 for viewing the processes executing on the workstation. Data entry is possible using keyboard 20, mouse 22 or other computer readable medium such as diskette drive 24. Data storage is provided by disk 28, which is attached to the system bus 26. A communication adapter 30, is provided for attachment of the computer to the distributed computing environment (not shown).

Figure 2:
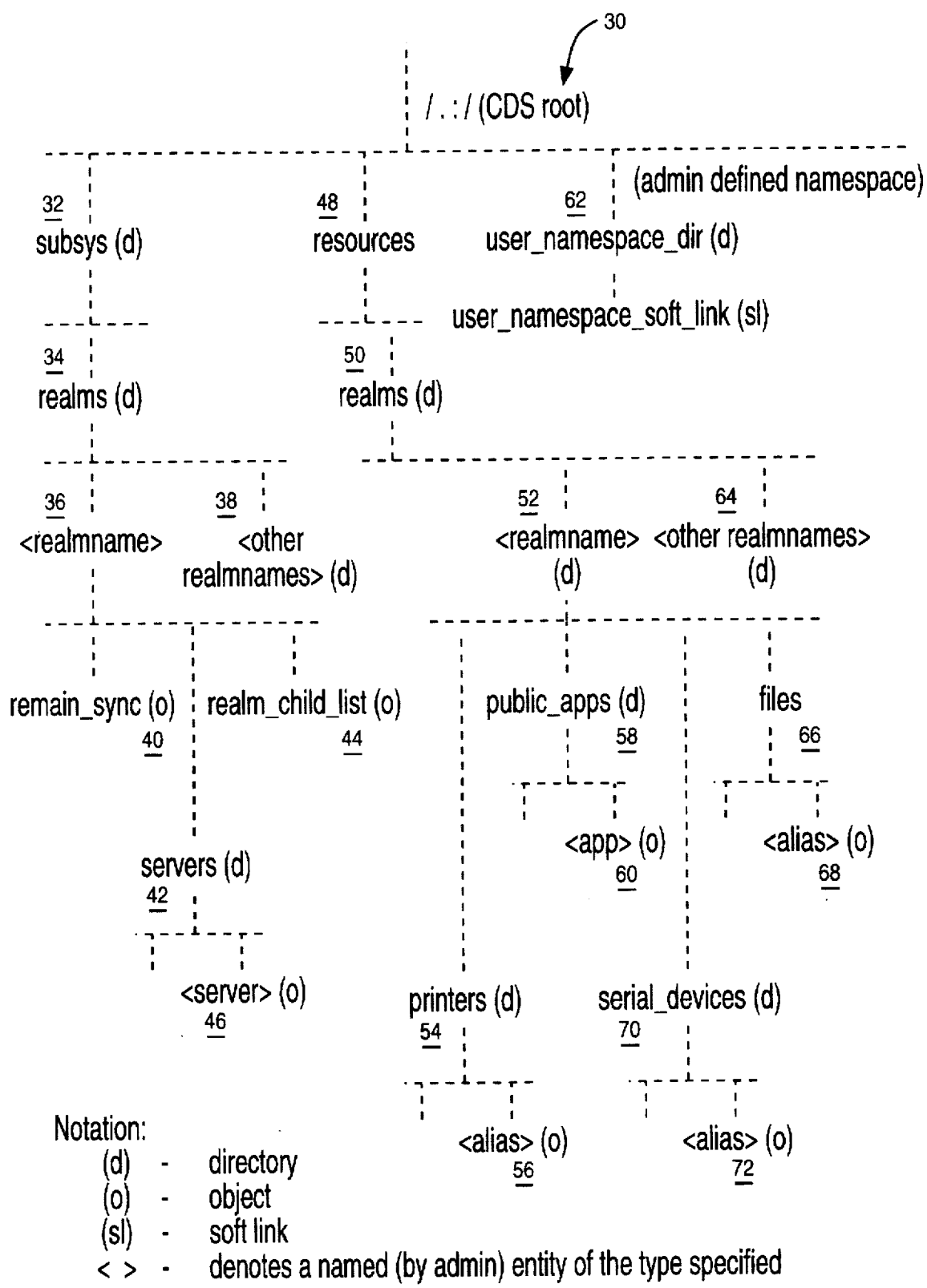
FIG. 2 is a structural model for the cell directory service component of the invention.

Turning to FIG. 2, there is shown the structural model for organizing the name space of an OSF/DCE Cell Directory Service. The CDS contains information about domain controllers defined within a cell. In addition, the CDS contains information about shared resource definitions (Aliases) and controls for synchronization of data from the CDS to domain controllers. A cell within the OSF/DCE environment is partitioned into multiple resource realms based on the structure shown in FIG. 2. A realm as used in this invention, is a name space within a DCE environment dedicated to a particular set of users/enterprise. Resource realms provide an architecture for organizing the DCE name space for specific resources (e.g., aliases, public applications, server definitions) and for controlling access to these resources.

Resource realms have a Cell Directory Service (CDS), and a registry component. With reference to FIG. 2, the CDS component 30 of the resource realm is shown. A fixed portion of the CDS resource realm name space contains two roots. The first root—/.:/subsys/realms/—provides for the description of any subsystem 32 and realm directories 34. The subsystem directory 32 is used to store LAN Server objects which are required to control/maintain the realm architecture. The realms, 38, represent "N" more occurrences of instances of object 36 in directory 34. A fixed structure is defined below each realm in the CDS name space. The server directory 42 contains an entry for each server defined in the realm. The domain_sync 40 is an optional object which is created only in realms which are synchronized with a different LAN Server domain. The dirsync (directory synchronization) process queries this object to determine the list of updates which must be synchronized within the name space. The realm_child_list 44 object contains the list of realms which are directly below this realm in the logical realm hierarchy. A server object 46 is defined for every server in the realm and is located in the servers directory 42 of the realm name space. Each server object 46 contains the following attributes:

+Server type

+Transport protocol (i.e., NETBIOS, TCP/IP, etc.)

+Transport address

+RPC binding information

Alias objects 56, 68, and 72 are LAN Server defined resource definitions (aliases), created as CDS objects within the appropriate resource type container (e.g., files, printers, serial_devices) of a realm. Alias resources definitions information is stored as attributes of the object. The simple name of the alias object is the LAN Server short name (e.g., upper case and 8 character length limit). Simple names must be unique within the realm for alias definitions. The alias objects is not a DCE RPC, because the DCE acl_edit service will not resolve the physical resource defined by the alias object. Aliases are defined local to a realm, thus precluding the use of short names alone to identify them. Unique identification is possible only by specification of the realm name. One skilled in the art will appreciate that the realm hierarchy is not directly reflected in the directory structure in the CDS component. Instead, each individual realm directory in the subsystem portion of the name space contains an attribute that points to the realm's parent in the realm hierarchy, and the "realm_child_list" object 44 contains the list of the realm's immediate children in the realm hierarchy. Realm operations are greatly simplified by not tightly coupling the name space structure to the logical realm hierarchy. Realm operations, such as move and delete, in a tightly coupled arrangement require significant logic when the hierarchy is reflected in the name space. Each individual realm directory in the "subsys" portion 32 of the name space has an attribute that contains the broadcast address for the realm. The address is used by LAN Servers to broadcast their presence and by clients to listen for server announcements. One skilled in the art will appreciate that an administrator can setup a separate name space 62 via CDS softlinks, that are convenient for users to browse. For example, an administrator my want to organize the resource name space based on the physical location of the resources (e.g., austin→Bldg 901→Floor 7→Printers). The result is a directory which is potentially more intuitive to both the end user and the administrator.

Returning to FIG. 2, the second root—/.:/resource/realm—also contains a fixed directory structure defined below the realm in the resources 48 portion of the name space. The realms, 52, represents "N" more occurrences of its sibling object 52 in directory 50. The files directory 66 contains all the file aliases defined in the realm. Attributes on the files directory 66 maintain a list of the files aliases. Each entry in the list contains the short name of the alias and information about the alias that is required on enumeration. This list is used to improve the performance of enumeration and the performance of determining short name uniqueness. The printers directory 54 contains all the print aliases in the realm. Attributes on the printers directory 54 maintain a list of the print aliases. Each entry in the list contains the short name of the alias and information about the alias that is required on enumeration. This list is used to improve the performance of enumeration and the performance of determining short name uniqueness. The serial_devices directory 70 contains all the serial devices in the realm. Attributes on the serial_devices directory 70 maintain a list of the serial device aliases. Each entry in the list contains the short name of the alias and information about the alias that is required on enumeration. The public_apps 58 directory contains all the public applications in the realm. Public application definitions are created as CDS objects within the public_apps 58 container of a realm. The simple name of the apps object is the LAN Server short name (e.g., Upper case and 8 character length limit). Simple names are unique with a realm for public_apps 58 definitions. Application definitions do not define specific physical resources or resource paths and thus the application is not a DCE RPC junction. Public applications are defined local to a realm. The short name alone is insufficient to uniquely identity them and the realm name must be specified.

Figure 3:
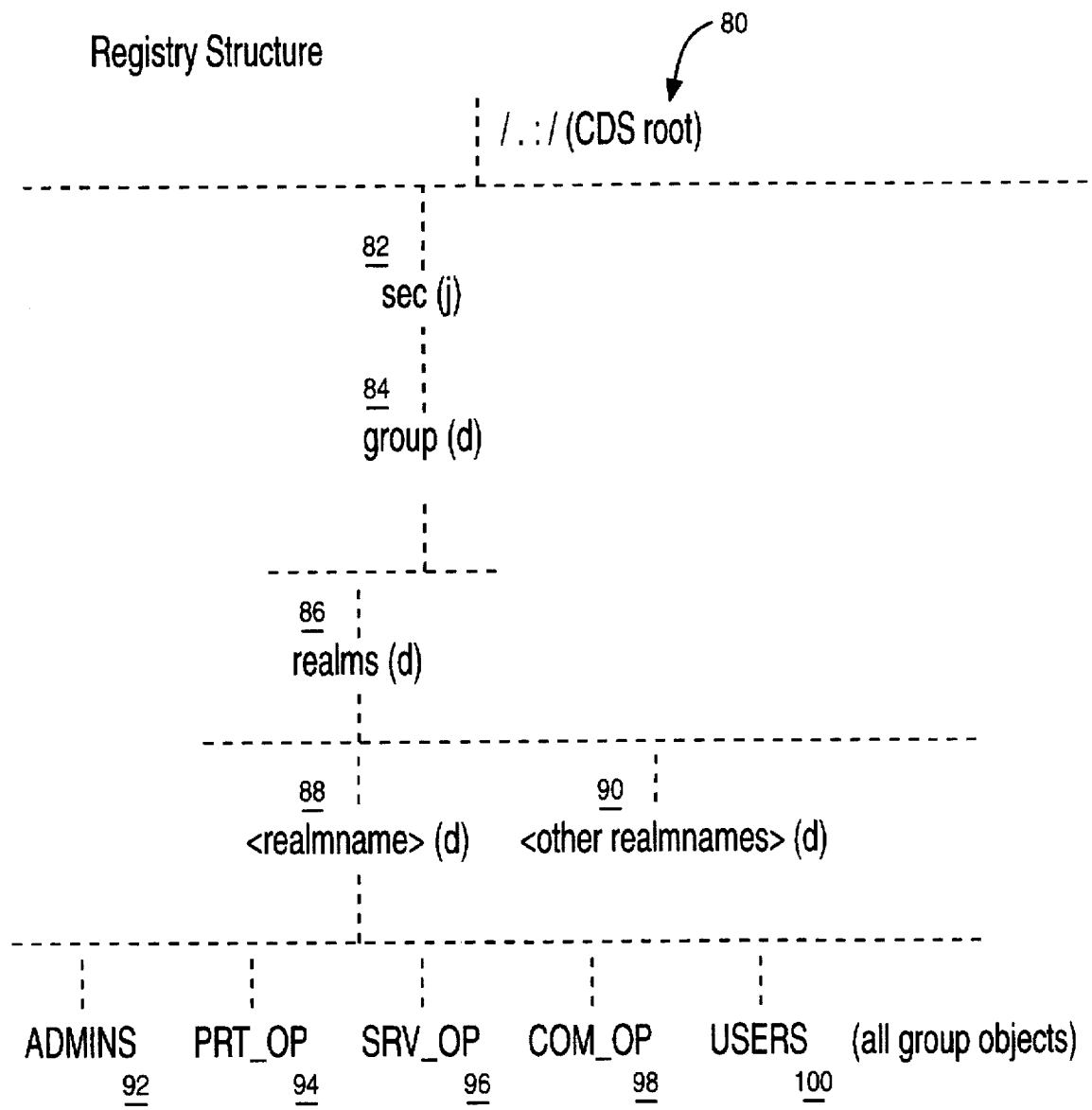
FIG. 3 is a structural model for the registry component of the invention.

Turning now to FIG. 3, there is shown a structure for the registry component of the resource realm. The root of the realm name space in the registry is "/.:/sec/group/realms". The root represents a security junction 82, group directory 84 and a realms directory 86. As was the case with the Cell Directory Service (CDS), all realms in the registry component are defined directly below the realm's root, and are named within the constraints of valid registry directory names, which are permitted to be up to 256 characters. A fixed structure consisting of six group objects 92-100, is defined for each realm.

The ADMINS group 92, contains the user identifications (IDs) of all the LAN Server administrators in the realm. The ADMINS group 92, is used to control access to the realm, and are the only members of the realm who have administrator authority over the realm groups defined in the registry. The PRT_OP group 94 contains the user Ids of all the LAN Server print operators in the realm. The PRT_OP group 94 is used to control access to the print aliases in the realm. The SRV_OP group 96 contains the user IDs of all the LAN Server operators in the realm. The SRV_OP group 96 is used to control access to the file alias and server objects in the realm. The COMM_OP group 98 contains the user IDs of all the LAN Server communication operators in the realm. The COMM_OP group 98 is used to control access to the serial device aliases in the realm. The USERS group 100 contains the user IDs and group IDs of all the users/groups defined in the realm. The USERS group 100 is used by the synchronization process to determine which user and group definitions to synch to the domain for client and server access. The USERS group 100 is also used to scope the user/group objects. Since DCE does not support groups within groups, the USERS group 100 maintains the list of groups to synchronize. Synchronization of LAN Server resource definitions in the cell is tied to realms. The dirsync process is associated with a specific resource realm and synchronizes all alias and application objects defined in the realm. The domain_sync object 40 (FIG. 2) in the realm name space in CDS is used by the dirsync process to determine which resource objects have been updated in the realm since the last synch time. The dirsync process removes entries from the domain_sync list after it synchronizes the objects. The synchronization process also relies on the USERS group 100 in the realm structure of the registry to synchronize user and group definitions.

Migration of existing OSF/DCE name space to the novel cell directory and registry of the invention is accomplished through a migration utility modified for the structures of the invention, such as the *Migration Utility for Distributed Computing Environment Application Enabler for OS/2*, TDBS, Vol. 38, March 1995, Pages 473–76. Existing LAN Server domains migrated to the novel CDS structure of this invention will have their resource definitions (aliases and public applications) migrated to a resource realm. The administrator migrating the domain will be prompted for a realm name (the default is the existing domain name), and the proper realm objects are created in both the CDS and registry. In addition to creating the alias and application objects, the migration utility populates the special realm groups with the administrators and operators defined in the domain. The USER group 100 (FIG. 3) is populated with all users/groups in the domain which have been successfully migrated to ensure that these definitions are synchronized for clients and servers.

While the invention has been described with respect to a preferred embodiment thereof, it will be understood by those skilled in the art that various changes in detail may be made therein without departing form the spirit, scope, and teaching of the invention. Accordingly, the herein disclosed invention is to be limited only as specified in the following claims.

What we claim is:

1. A method implemented in a computer for organizing distributed computing environment name space for administration of network resources, comprising:

creating a cell directory service component in a workstation in said distributed computing environment name space having a fixed portion including a first root and a second root describing realm resources;

associating a subsystem and a first realm directory with said first root and resources and a second realm directory with said second root; and creating a registry component associated with said cell directory service component having a security and group directory for specifying user identification of all administrators allowed to access said realm resources.

2. The method of claim 1 wherein said step for creating a cell directory service component includes the step of creating a fixed directory structure for the realm resources.

3. The method of claim 1 wherein said step for creating a registry component includes the step of creating a fixed structure below said group directory files directory containing a group object within said realm resources.

4. The method of claim 1 wherein said step creating a registry component includes the step of creating a printers directory containing all printers within said realm resources.

5. The method of claim 3 wherein said step for creating a registry component includes the step of creating a public applications directory containing all applications accessible by users within said realm resources.

6. An apparatus for organizing distributed computing environment name space for administration of network resources, comprising:

means for creating a cell directory service component in a workstation in said distributed computing environment name space having a fixed portion including a first root and a second root describing realm resources;

associating a subsystem and a first realm directory with said first root and resources and a second realm directory with said second root; and means for creating a registry component associated with said cell directory service component having a security and group directory for specifying user identification of all administrators allowed to control said realm resources.

7. The apparatus of claim 6 wherein said means for creating a cell directory service component includes means for creating a fixed directory structure for said realm resources.

8. The apparatus of claim 6 wherein said means for creating a registry component includes means for creating a fixed structure below said group directory containing a group object within said realm resource.

9. The apparatus of claim 6 wherein said means for creating a registry component includes means for creating a printers directory containing all printers within said realm resource.

10. The apparatus of claim 6 wherein said means for creating a registry component includes means for creating a public applications directory containing all applications accessible by users within said realm resources.

11. A computer program product having a computer readable medium having computer program logic recorded thereon for organizing distributed computing environment name space for administration of network resources, comprising:

computer readable medium for creating a cell directory service component in a workstation in said distributed computing environment name space having a fixed portion including describing realm resources;

associating a subsystem and a first realm directory with said first root and resources and a second realm directory with said second root; and computer readable medium for creating a registry component associated with said cell directory service component having a security and group directory for specifying user identification of all administrators allowed to access said realm resources.

12. The computer program product of claim 10 wherein said computer readable medium means for creating a cell directory service component includes the step of creating a fixed directory structure for the realm resources.

13. The computer program product of claim 10 wherein said computer readable medium means for creating a registry component includes the step of creating a fixed structure below said group directory containing a group object within said realm resources.

14. The computer program product of claim 10 wherein said computer readable medium means for creating a registry component includes the step of creating a printers directory containing all printers within said realm resources.

15. The computer program product of claim 10 wherein said computer readable medium means for creating a registry component includes the step of creating a public applications directory containing all applications accessible by users within said realm resources.

\* \* \* \* \*